Oct. 15, 1929.   D. C. CRICHTON   1,732,153
HOISTING AND TRANSPORTING DEVICE
Filed Aug. 3, 1928   2 Sheets-Sheet 1

WITNESSES

INVENTOR
DELMA C. CRICHTON
BY
ATTORNEYS

Oct. 15, 1929.  D. C. CRICHTON  1,732,153
HOISTING AND TRANSPORTING DEVICE
Filed Aug. 3, 1928  2 Sheets-Sheet 2
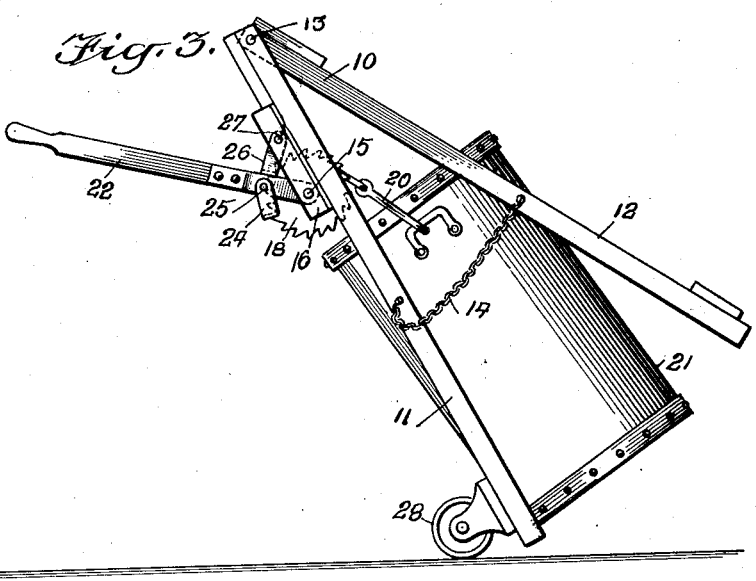
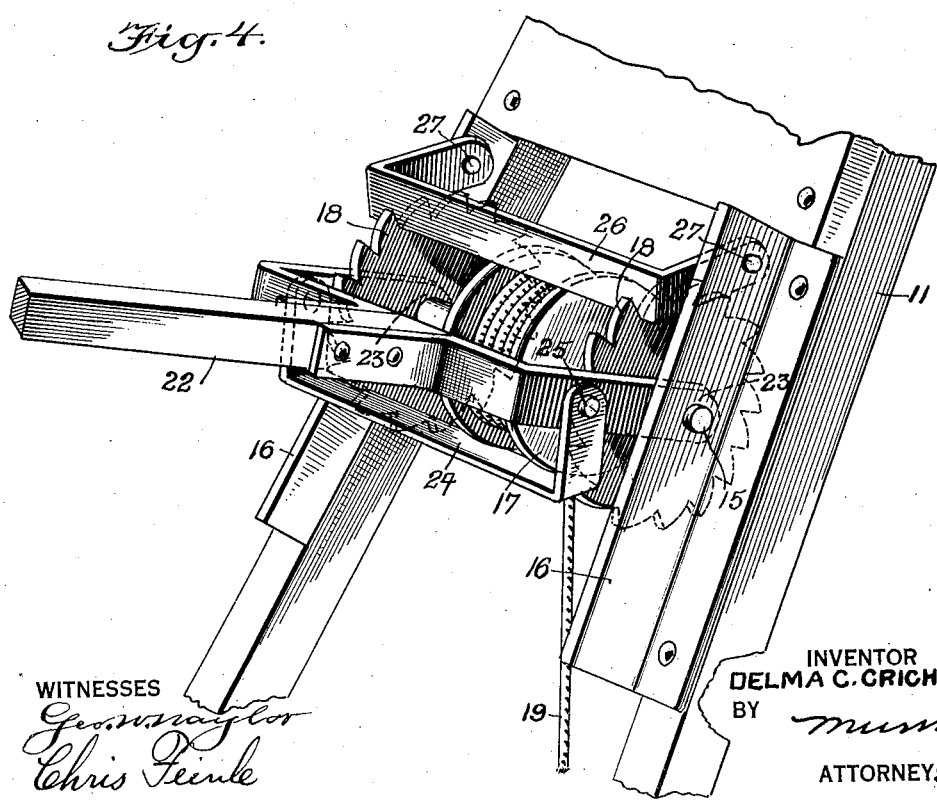
INVENTOR
DELMA C. CRICHTON.
BY
ATTORNEYS
WITNESSES Patented Oct. 15, 1929

1,732,153

UNITED STATES PATENT OFFICE

DELMA C. CRICHTON, OF BROOKLYN, NEW YORK

HOISTING AND TRANSPORTING DEVICE

Application filed August 3, 1928. Serial No. 297,131.

This invention relates to a hoisting and transporting device, and has especial reference to a device for hoisting cans of ashes and refuse from a cellar or basement, and for transporting a loaded can to disposal points, and for transporting the empty can to a convenient point for the purpose of lowering the empty can through a suitable opening into the cellar or basement.

The principal object of the invention is the provision of a rugged and effectual device of the indicated character of improved construction and operation adapting the same for the attainment of the results looked for.

The nature of the invention and its distinguishing features and advantages will appear when the following specification is read in connection with the accompanying drawing, in which—

Fig. 3, is a side elevation of the device in use for transporting the can.

Fig. 4, is a fragmentary perspective view of the upper section of the device.

Figure 1:
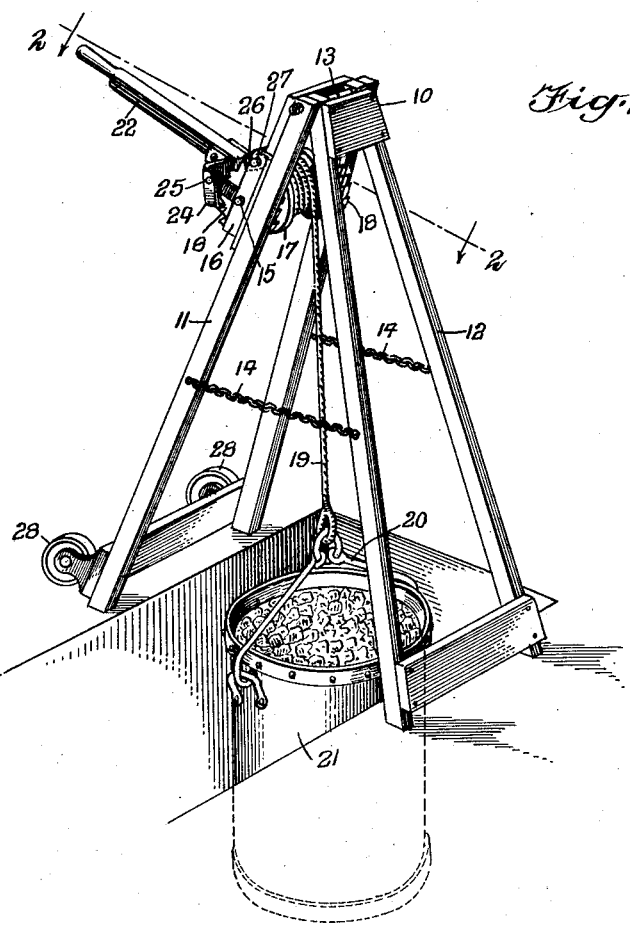
Figure 1 is a perspective view of a device embodying the features of the invention, the device being shown in use for hoisting a loaded can.
Figure 2:
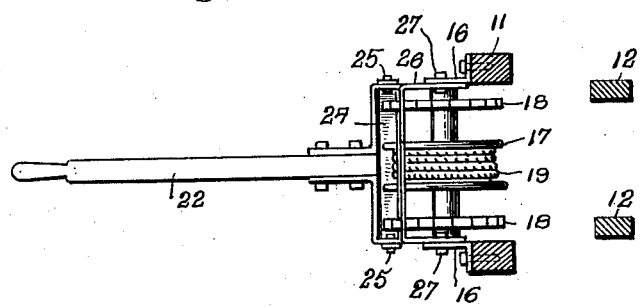
Fig. 2 is a sectional view taken on the line 2—2, of Fig. 1.

Referring now more particularly to the drawings it will be apparent, that the device in the illustrated embodiment of the invention will include a suitable structure 10 which is adapted to be set up over a hole or opening communicating with a cellar or basement, and also to support a can in an inclined position for the purpose of transporting the can. The structure 10 comprises frames 11 and 12, each of which is substantially of triangular construction being narrower at the top than at the base. These frames 11 and 12 are connected together for relative movement, use being made of a bolt 13 which pivotally connects together the upper ends of said frames. Chains or like elements 14 are connected with the frames 11 and 12 to limit the relative movement thereof away from each other.

Hoisting and lowering means is arranged on the structure 10 near the top thereof. The said means includes a body which is mounted for rotation on an axle or shaft 15 supported by bearing members 16 on the frame 11. The said body is constructed to provide a drum or spool 17 and ratchet wheels 18 respectively at opposite sides of the drum or spool 17. One end of a cable 19 is attached to the drum or spool 17, the said cable being wound on and unwound from the drum or spool 17, and has connected with the free end thereof a suitable grapple or tongs 20 engageable with the handles of can or other receptacle 21. A handle 22 is pivotally connected as at 23 with the bearing members 16. A U-shaped gravity pawl or dog 24 is connected as at 25 with the handle 22 for pivotal movement with respect thereto. The said pawl or dog 24 is engageable with the teeth of the ratchet wheels 18 and serves for imparting rotatory movement to the drum or spool 17 in response to the downward movement of the handle 22 to wind the cable 19 on the drums or spool 17, for the purpose of hoisting a loaded can. A U-shaped pawl or dog 26 is connected as at 27 with the bearing member 16 for pivotal movement. The said pawl or dog 26 is engageable with the teeth of the ratchet wheels 18 to prevent retrograde turning movement of the drum or spool 17 during the hoisting operation. The pawl or dog 26 is readily disengageable from the ratchet wheels 18, consequently the drum or spool 17 may be allowed to rotate freely to allow the cable to unwind for the purpose of lowering a can.

In accordance with another feature of the invention, the device in its entirety may be transported from a hole or opening communicating with a cellar or basement to suitable disposal points, with a loaded can or receptacle, and also for the purpose of bringing an empty can or receptacle to the hole or opening for the purpose of lowering the same into a cellar or basement. The frame 11 of the structure 10 at the base thereof is provided with suitable rollers 28.

In Fig. 1 the device is shown in use for the purpose of hoisting a loaded can, it being apparent that the frames 11 and 12 are spread apart so that the device will be set up directly over the hole or opening communicating with a cellar or basement out of which the loaded can or receptacle is hoisted. The hoisting of the loaded can is accomplished by moving the handle 22 up and down until the can has been elevated to a position in which the bottom thereof will be slightly above the surfaces adjoining the cellar opening. The handle 22 may then be brought into engagement with the pawl or dog 26, and at the same time the structure 10 may be canted to a position in which the device may be readily transported by exerting a pull on the handle 22. It will be apparent that both dogs 24 and 26 may remain in engagement with the teeth of the ratchet wheels 18 to prevent the cable from unwinding from the spool, and in this manner the loaded can will be held in place on the frame 11 of the structure 10 while being transported, as shown most clearly in Fig. 3. The loaded can may be readily separated from the device by releasing the dogs 24 and 26. The empty can may with equal facility be held in place on the frame 11 by engaging the tongs 20 with the handles thereof, and by again engaging the dogs 24 and 26 with the ratchet wheels 18. When the device is brought into position over the cellar or basement opening the dogs 24 and 26 may be disengaged to allow the cable to unwind from the spool 17, to lower the empty can into the cellar or basement.

I claim:

A device comprising a supporting structure adapted to rest upright on a suitable support, traction rollers positioned on said structure above the base thereof whereby to transport the device when brought to a transporting position, hoisting, holding and lowering means on said structure near the top thereof, said means including a handle for operating said means, and said means also including a retaining member positioned to be engaged by said handle to support the upper end of said structure and enabling a pulling force to be applied to the handle for the purpose of transporting the device on the rollers.

Signed at New York, N. Y., in the county of New York and State of New York this 1st day of August A. D., 1928.

DELMA C. CRICHTON.